United States Patent
Lele et al.

(10) Patent No.: US 8,394,647 B2
(45) Date of Patent: Mar. 12, 2013

(54) REDUCING NON-COVALENTLY BOUND POLYSACCHARIDE ON SUPPORTS

(75) Inventors: Bhalchandra Lele, Newark, DE (US); Pratap Singh, Wilmington, DE (US); Asoke Chatterjee, Chadds Ford, PA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 85 days.

(21) Appl. No.: 13/029,786

(22) Filed: Feb. 17, 2011

(65) Prior Publication Data

US 2012/0214978 A1  Aug. 23, 2012

(51) Int. Cl.
*G01N 33/544* (2006.01)
(52) U.S. Cl. ........ 436/529; 436/508; 436/509; 436/534; 502/404
(58) Field of Classification Search .................. 436/529, 436/508, 509, 534; 502/404
See application file for complete search history.

(56) References Cited

U.S. PATENT DOCUMENTS

| | | | |
|---|---|---|---|
| 4,020,133 A | 4/1977 | Altares, Jr. | |
| 4,254,082 A | 3/1981 | Schick et al. | |
| 4,351,824 A | 9/1982 | Lehrer | |
| 4,801,504 A * | 1/1989 | Burdick et al. | 428/403 |
| 5,583,162 A | 12/1996 | Li et al. | |
| 6,231,982 B1 | 5/2001 | Wang | |
| 6,589,665 B2 | 7/2003 | Chabrecek et al. | |
| 7,094,369 B2 | 8/2006 | Buiser et al. | |
| 7,179,660 B1 | 2/2007 | Kirakossian et al. | |
| 2003/0054360 A1 * | 3/2003 | Gold et al. | 435/6 |
| 2003/0175994 A1 | 9/2003 | Palti | |

OTHER PUBLICATIONS

KAr P. Lok and Christopher K. Ober, Particle size control in dispersion polymerization of polystyrene, Can. J., Chem., vol. 63, 1985, pp. 209-216.

* cited by examiner

*Primary Examiner* — Colleen Dunn
*Assistant Examiner* — Haytham Soliman
(74) *Attorney, Agent, or Firm* — Theodore J. Leitereg

(57) ABSTRACT

Methods and reagents are disclosed for reducing an amount of non-covalently bound polysaccharide on a support. The method comprises contacting a support comprising both covalently bound polysaccharide and non-covalently bound polysaccharide with an aqueous solution comprising an amount of a chaotropic agent effective to remove non-covalently bound polysaccharide from the support.

17 Claims, No Drawings

REDUCING NON-COVALENTLY BOUND POLYSACCHARIDE ON SUPPORTS

BACKGROUND

The disclosure relates to the preparation and purification of polysaccharide-coated supports. More particularly, the disclosure relates to methods and kits to remove non-covalently bound polysaccharide polymer from polysaccharide-coated particles while at the same time reducing the size, changing shape and/or enhancing permeability of such polymer.

In the fields of medicine and clinical chemistry, many studies and determinations of physiologically reactive species such as cells, proteins, enzymes, cofactors, nucleic acids, substrates, antigens and antibodies, for example, are carried out using conjugates involving assay molecules such as, for example, specific binding pair (sbp) members or members of a signal-producing system (sps), e.g., labels, conjugated to supports. Various assay techniques that involve the binding of sbp members are known. These assay techniques generally also involve an sps member, e.g., a label, used in the detection part of the assay.

Polysaccharides, particularly dextran and dextran derivatives, have been conjugated to supports such as, for example, particles, to increase the hydrophilicity of the surface of the support and to provide conjugation sites for covalent attachment of molecules such as, for example, sbp members and sps members, to the surface of the support. The resulting conjugates of sbp members and supports permit specific binding of a complementary sbp member to the surface of the support with greatly reduced non-specific binding.

The support may be covalently coupled to the polysaccharide coat or layer by reaction between functional groups of the support and functional groups of the polysaccharide thereby resulting in the covalent attachment of the polysaccharide to the support. In some instances the functional groups of the support are amine reactive functional groups and the functional groups of the polysaccharide are amine functional groups. In some instances the functional groups of the support are amine groups and the functional groups of the polysaccharide are amine reactive functional groups. The amine reactive functional group may be, for example, an aldehyde group or a carboxyl group.

In addition to the covalent attachment of the polysaccharide to the support, there is also a certain amount of polysaccharide that becomes non-covalently bound to the support. After the covalent attachment of the polysaccharide to the support, but prior to attachment of an assay molecule, this non-covalently bound polysaccharide should be removed. Many processes have been employed in the past to remove non-covalently bound polysaccharide from a support. Typically, such processes involve extensively washing particles with various buffers and surfactants. In some instances sonication has also been used in the treatment of such supports. In another approach repeated washings followed by centrifugation have been utilized. Washing and other procedures for removing non-covalently bound polysaccharide are very slow and labor intensive and have been found to be less than adequate in reducing the amount of non-covalently bound polysaccharide to acceptable or negligible levels. The difficulties of such removal become more imposing as the scale of the preparation of the polysaccharide-bound supports increases such as in, for example, scale-up in manufacturing.

There is, therefore, a need to develop a procedure for reducing to a negligible level the amount of non-covalently bound polysaccharide in the preparation of polysaccharide-bound supports.

SUMMARY

One example of a method in accordance with the principles disclosed herein is a method of reducing an amount of non-covalently bound polysaccharide on a support. The method comprises contacting a support comprising both covalently bound polysaccharide and non-covalently bound polysaccharide with an aqueous solution comprising an amount of a chaotropic agent effective to remove non-covalently bound polysaccharide from the support.

Another example of a method in accordance with the principles disclosed herein is a method of preparing a conjugate of a support and an assay molecule. The method comprises treating a support under conditions for covalently binding a polysaccharide to the support, contacting the support with an aqueous solution comprising an amount of a chaotropic agent effective to remove non-covalently bound polysaccharide from the support, separating the support from the aqueous solution, and contacting the support with an assay molecule under conditions for binding of the assay molecule to the covalently bound polysaccharide.

Another example of a method in accordance with the principles disclosed herein is a method of reducing an amount of non-covalently bound dextran or dextran derivative on a latex particle. A latex particle comprising both covalently bound dextran derivative and non-covalently bound dextran derivative is contacted with an aqueous solution comprising an amount of one or more chaotropic agents effective to remove non-covalently bound dextran derivative from the support. The latex particle is separated from the aqueous solution by contacting the aqueous solution with a membrane wherein substantially all of the non-covalently bound dextran derivative passes through the membrane.

DETAILED DESCRIPTION OF SPECIFIC EMBODIMENTS

General Discussion

As indicated above, in some examples the present disclosure is directed to a method of reducing an amount of non-covalently bound polysaccharide on a support. Non-covalently attached polysaccharide refers to polysaccharide that becomes bound to a support by other than a covalent bond during the reaction process wherein a polysaccharide is reacted with the support to covalently bind the polysaccharide to the support. Polysaccharide may become non-covalently bound to the support as the result of one or more of hydrogen bonding, van der Waals forces, electrostatic forces, hydrophobic effects, physical entrapment in the matrix of the support particles, and charged interactions, for example. As mentioned above, non-covalently bound polysaccharide is undesirable when the support is utilized in an assay.

The support may be comprised of an organic or inorganic, solid or fluid, water insoluble material, which may be transparent or partially transparent. The support can have any of a number of shapes, such as a particle (particulate support) including bead, a film, a membrane, a tube, a well, a strip, a rod, and planar surfaces such as, e.g., plate, paper, etc., fiber, for example. The support may or may not be suspendable in the medium in which it is employed. Examples of suspendable supports are polymeric materials such as latex, lipid bilayers or liposomes, oil droplets, cells and hydrogels, and magnetic particles, for example. Other support compositions include polymers, such as nitrocellulose, cellulose acetate, poly(vinyl chloride), polyacrylamide, polyacrylate, polyethylene, polypropylene, poly(4-methylbutene), polystyrene, polymethacrylate, poly(ethylene terephthalate), nylon, poly (vinyl butyrate), etc.; either used by themselves or in conjunction with other materials.

In some examples the support may be a particle. The particles have an average diameter of at least about 0.02 microns and not more than about 100 microns. In some examples, the particles have an average diameter from about 0.05 microns to about 20 microns, or from about 0.3 microns to about 10 microns. The particle may be organic or inorganic, swellable or non-swellable, porous or non-porous, preferably of a density approximating water, generally from about 0.7 g/mL to about 1.5 g/mL, and composed of material that can be transparent, partially transparent, or opaque. The particles can be biological materials such as cells and microorganisms, e.g., erythrocytes, leukocytes, lymphocytes, hybridomas, *streptococcus, Staphylococcus aureus*, and *E. coli*, viruses, for example. The particles can also be particles comprised of organic and inorganic polymers, liposomes, latex particles, magnetic or non-magnetic particles, phospholipid vesicles, chylomicrons, lipoproteins, and the like. In some examples, the particles are chromium dioxide (chrome) particles or latex particles.

Polymeric particles can be formed from addition or condensation polymers. The particles are readily dispersible in an aqueous medium. The particles can also be derived from naturally occurring materials, naturally occurring materials that are synthetically modified, and synthetic materials. Among organic polymers of particular interest are polysaccharides, particularly cross-linked polysaccharides, such a agarose, which is available as SEPHAROSE®, dextran, available as SEPHADEX® and SEPHACRYL®, cellulose, starch, and the like; addition polymers, such as polystyrene, polyvinyl alcohol, homopolymers and copolymers of derivatives of acrylate and methacrylate, particularly esters and amides having free hydroxyl functionalities, for example.

In the context of the present disclosure, the term "polysaccharide" refers to a macromolecule that is a polymeric carbohydrate in forms that are both miscible (soluble) and immiscible (insoluble in) with water, which includes, for example, dextran (available, e.g., as a powder (water soluble) or as SEPHADEX® and SEPHAROSE®), dextran derivatives, agarose (available, e.g., as SEPHAROSE®), cellulose, starch, glycogen and chitin and including derivatives of the above. The term "derivative" means that the polysaccharide is functionalized with a functional group for reaction with a functional group of another entity such as, for example, a support. In some instances the polysaccharide is dextran or a dextran derivative. The polysaccharide derivative comprises a functional group such as an amine group, an amine reactive functional group or an alcohol reactive functional group, examples of which are set forth below. In some examples the functional groups of the support are amine reactive functional groups and the functional groups of the polysaccharide are amine functional groups. In some examples the functional groups of the support are amine groups and the functional groups of the polysaccharide are amine reactive functional groups.

As mentioned above, the support may be covalently coupled to the polysaccharide coat or layer by reaction between functional groups of the support and functional groups of the polysaccharide, which form a bond thereby resulting in the covalent attachment of the polysaccharide to the support (covalently attached polysaccharide). The nature of the functional groups employed is dependent on one or more of the nature of the support, the nature of the polysaccharide, flexibility in incorporation of functional groups on the polysaccharide and the support, and intended uses of the polysaccharide coupled support material, for example. The functional groups on the support and on the polysaccharide may be naturally present or may be introduced synthetically by techniques that are well known in the art. The term "functional group" refers to a functionality that can react with a corresponding reactive functionality on another molecule to form a covalent bond. Such reactive functionalities include, by way of illustration and not limitation, aldehyde, carboxy, amino, imino, sulfhydryl and hydroxy, for example. A large number of suitable functional groups are available for attaching to amino groups (amine reactive functional groups), carboxy groups (carboxy reactive functional groups), sulfhydryls (sulfhydryl reactive functional groups), and alcohols (alcohol reactive functional groups), for example. Such functional groups include, but are not limited to, activated esters including, e.g., carboxylic esters, imidic esters, sulfonic esters and phosphate esters; activated nitrites; aldehydes; ketones; maleimides; haloalkylamides; and alkylating agents, for example.

In some examples functional groups are present on one or both of the polysaccharide and the support by means of a linking group, which may comprise a chain of from 1 to about 60 or more atoms, or from 1 to about 50 atoms, or from 1 to about 40 atoms, or from 1 to 30 atoms, or from about 1 to about 20 atoms, or from about 1 to about 10 atoms, each independently selected from the group normally consisting of carbon, oxygen, sulfur, nitrogen, and phosphorous, usually carbon and oxygen. The number of heteroatoms in the linking group may range from about 0 to about 8, from about 1 to about 6, or about 2 to about 4, and include heteroatoms that may be present in a functional group on the linking group. The atoms of the linking group may be substituted with atoms other than hydrogen such as, for example, one or more of carbon, oxygen and nitrogen in the form of, e.g., alkyl, aryl, aralkyl, hydroxyl, alkoxy, aryloxy, or aralkoxy groups. As a general rule, the length of a particular linking group can be selected arbitrarily to provide for convenience of synthesis with the proviso that there is minimal interference caused by the linking group with the ability of the linked molecules to perform their function related to the assay in question. The linking group may be aliphatic or aromatic. When heteroatoms are present, oxygen will normally be present as oxy or oxo, bonded to carbon, sulfur, nitrogen or phosphorous; sulfur will be present as thioether or thiono; nitrogen will normally be present as nitro, nitroso or amino, normally bonded to carbon, oxygen, sulfur or phosphorous; phosphorous will be bonded to carbon, sulfur, oxygen or nitrogen, usually as phosphonate and phosphate mono- or diester. Functionalities present in the linking group may include esters, thioesters, amides, thioamides, ethers, ureas, thioureas, guanidines, azo groups, thioethers, carboxylate and so forth. The linking group may also be a macro-molecule such as polysaccharides, peptides, proteins, nucleotides, and dendrimers.

In an exemplary method in accordance with the principles disclosed herein, a support comprising both covalently bound polysaccharide and non-covalently bound polysaccharide is contacted with an aqueous solution comprising an amount of one or more chaotropic agents effective to remove non-covalently bound polysaccharide from the support. In many instances a support comprising both covalently bound polysaccharide and non-covalently bound polysaccharide is one that has been the subject of a reaction to covalently bind the polysaccharide with the support. The reaction product is a support that can comprise non-covalently bound polysaccharide as well as covalently bound polysaccharide as explained above.

In some instances the chaotropic agent is selected from the group consisting of trifluoroacetate salts, trichloroacetate salts, thiocyanate salts, urea salts, thiourea salts, guanidinium salts, perchlorate salts, nitrate salts, bromide salts, iodide salts, trifluoromethane sulfonate salts, hexafluorophosphate salts, and bis(trifluoromethanesulfonyl)imidourea salts, for example. The counter ion of the salt may be a metal ion such as, e.g., sodium ion, potassium ion, and lithium ion; ammonium ion, for example.

The aqueous solution comprises primarily water and may include from 0.1 to about 40 volume percent of a cosolvent such as, for example, a water miscible organic solvent, e.g., an alcohol, an ether or an amide. The aqueous solution may also comprise a buffer for pH control, for example. Some of the factors that influence the selection of a pH for the aqueous solution include, for example, providing for maximum removal of non-covalently bound polysaccharide from the support, stabilizing the chaotropic agent, stabilizing the polysaccharide-bound solid support, and nature of the diafiltration membrane employed during removal of the non-covalently bound polysaccharide. Selection of the pH may be the result of a compromise among the aforementioned factors. In some examples in accordance with the present disclosure, the pH for the aqueous solution may be in the range of about 4 to about 11, or in the range of about 5 to about 10, or in the range of about 6.5 to about 9.5.

Various buffers may be used to achieve the desired pH and maintain the pH during the method. Illustrative buffers include borate, phosphate, citrate, carbonate, tris, and barbital, for example. The particular buffer employed is not critical, but in an individual treatment one or another buffer or a combination of buffers may be preferred. Various ancillary materials may be employed in the above methods. For example, in addition to buffers the medium may comprise one or more detergents, stabilizers for the medium and for the reagents employed, and other reagents such as low molecular weight polyethyleneglycols that would help in separation of non-covalently coupled polysaccharide. All of the above materials are present in a concentration or amount sufficient to achieve the desired effect or function.

As mentioned above, the amount of the one or more chaotropic agents in the aqueous solution is that which is effective to remove non-covalently bound polysaccharide from the support. In some examples in accordance with the principles disclosed herein, the molar concentration of chaotropic agent in the aqueous solution is about 0.1 M to about 1 M, or about 0.1 M to about 0.9 M, or about 0.1 M to about 0.8 M, or about 0.1 M to about 0.7 M, or about 0.1 M to about 0.6 M, or about 0.1 M to about 0.5 M, or about 0.1 M to about 0.4 M, or about 0.1 M to about 0.3 M, or about 0.1 M to about 0.2 M, or about 0.2 M to about 1 M, or about 0.2 M to about 0.9 M, or about 0.2 M to about 0.8 M, or about 0.2 M to about 0.7 M, or about 0.2 M to about 0.6 M, or about 0.2 M to about 0.5 M, or about 0.2 M to about 0.4 M, or about 0.2 M to about 0.3 M, or about 0.3 M to about 1 M, or about 0.3 M to about 0.9 M, or about 0.3 M to about 0.8 M, or about 0.3 M to about 0.7 M, or about 0.3 M to about 0.6 M, or about 0.3 M to about 0.5 M, or about 0.3 M to about 0.4 M, about 0.4 M to about 1 M, or about 0.4 M to about 0.9 M, or about 0.4 M to about 0.8 M, or about 0.4 M to about 0.7 M, or about 0.4 M to about 0.6 M, or about 0.4 M to about 0.5 M, about 0.5 M to about 1 M, or about 0.5 M to about 0.9 M, or about 0.5 M to about 0.8 M, or about 0.5 M to about 0.7 M, or about 0.5 M to about 0.6 M, or about 0.6 M to about 1 M, or about 0.6 M to about 0.9 M, or about 0.6 M to about 0.8 M, or about 0.6 M to about 0.7 M, or about 0.7 M to about 1 M, or about 0.7 M to about 0.9 M, or about 0.7 M to about 0.8 M, or about 0.8 M to about 1 M, or about 0.8 M to about 0.9 M, or about 0.9 M to about 1 M, for example.

The aqueous solution is held at a temperature and for a time sufficient for non-covalently bound polysaccharide derivative to be substantially removed from the support, that is, removed from the support to a level such that the deleterious effects of the non-covalently bound polysaccharide derivative on the performance of an assay utilizing the support are substantially reduced. In some examples, the treatment of the support with non-covalently bound polysaccharide derivative is repeated sequentially with either the same chaotropic agent or with different chaotropic agents until the desired level of removal of the non-covalently bound polysaccharide is obtained. The number of sequential treatments may be, for example, 2, 3, 4, 5, 6, 7, 8, 9, 10, 11, 12, 13, 14, 15, 16, 17, 18, 19, 20 or more. The number of treatments is base in part on practicality and may depend on one or more of the nature of the chaotropic reagent and the levels of the non-covalently bound polysaccharide that are acceptable for optimal performance of the solid support that contains covalently bound polysaccharide, for example.

The removal of the non-covalently bound polysaccharide from the support may be followed by measuring the residual amount of the non-covalently bound polysaccharide on the support itself or measuring the residual amount of the non-covalently bound polysaccharide in the supernatant liquid. In some examples, the amount of non-covalently bound polysaccharide derivative remaining on the support is less than about 200 µg/mg, or less than about 150 µg/mg, or less than about 125 µg/mg, or less than about 100 µg/mg, or less than about 75 µg/mg, or less than about 50 µg/mg, or less than about 30 µg/mg, or less than about 25 µg/mg, or less than about 20 µg/mg, or less than about 15 µg/mg, or less than about 10 µg/mg, or less than about 5 µg/mg, for example. In some examples, the amount of non-covalently bound polysaccharide derivative remaining in the supernatant liquid is less than about 200 µg/mL, or less than about 150 µg/mL, or less than about 125 µg/mL, or less than about 100 µg/mL, or less than about 75 µg/mL, or less than about 50 µg/mL, or less than about 30 µg/mL, or less than about 25 µg/mL, or less than about 20 µg/mL, or less than about 15 µg/mL, or less than about 10 µg/mL, or less than about 5 µg/mL, for example. The amount of the non-covalently bound polysaccharide in the supernatant relates to the amount of non-covalently bound polysaccharide on the support in that a polysaccharide fraction that is not involved in one or more of the non-covalent physical forms of interactions such as hydrogen bonding, van der Waals forces, electrostatic forces, hydrophobic effects, physical entrapment in the matrix of the support particles, or charged interactions would appear in the supernatant solution. Disruption of one or more of similar non-covalent bonds by appropriate treatment in accordance with the principles described herein results in appearance of increased amounts of supernatant-soluble polysaccharide.

The temperature during the method may be about 5° to about 99° C., or from about 15° C. to about 70° C., or about 20° C. to about 45° C., for example. The time period for the method is about 1 minute to about 24 hours, or about 5 minutes to about 6 hours, or about 5 minutes to about 4 hours, or about 5 minutes to about 2 hours, or about 5 minutes to about 1 hour, or about 10 minutes to about 48 hours, or about 10 minutes to about 24 hours, or about 10 minutes to about 6 hours, or about 10 minutes to about 4 hours, or about 10 minutes to about 2 hours, or about 10 minutes to about 1 hour, for example. In some examples, the concentration of the chaotropic agent and the conditions of the treatment may be varied from one sequential treatment to the next.

For particulate supports, following treatment with the aqueous solution containing the chaotropic agent, or concomitantly therewith, the aqueous solution with the particulate support is subjected to filtration. Any form of filtration may be utilized including, for example, microfiltration such as, e.g., ultrafiltration, diafiltration, and gel filtration. Other forms of methods that would separate the non-covalently bound polysaccharide present in the supernatant solution may also be employed. These methods include without limitation magnetic separation, centrifugation and ion exchange chromatographic separation, for example. The method of choice for separation of the non-covalently bound polysaccharide from the solid support is dependent on the amounts of the reactants, relative proportions of the reactants, nature of the solid support and nature of the polysaccharide. The filtration should provide retention of particles of on the average diameter of about 0.05 to about 2.0 microns while allowing passage of particles less than about 0.05 microns, or less than about 0.04 microns, or less than about 0.03 microns, or less than about 0.02 microns, or of about 0.005 to about 0.02 microns average diameter. The filtration is conducted under the same conditions as discussed above for the treatment of the support with the aqueous solution comprising the chaotropic agent.

The pore size of the filter is dependent on a number of factors including, for example, the average diameter of a particulate support with attached polysaccharide, shape and size of the native polysaccharide and its native and modified form if any, e.g. polymerized form, during reaction with the solid support. The pore size of the filter should be about 0.02 to about 1 micron, or about 0.02 to about 0.5 microns, or about 0.02 to about 0.4 microns, or about 0.02 to about 0.3 microns, or about 0.02 to about 0.2 microns, or about 0.05 to about 1 micron, or about 0.05 to about 0.5 microns, or about 0.05 to about 0.4 microns, or about 0.05 to about 0.3 microns, or about 0.05 to about 0.2 microns, for example. The surface area of the filter should be about 100 to about 15000 square centimeters ($cm^2$), or about 100 to about 8000 $cm^2$, or about 100 to about 6000 $cm^2$, or about 100 to about 5000 $cm^2$, or about 100 to about 4000 $cm^2$, or about 200 to about 15000 square $cm^2$, or about 200 to about 8000 $cm^2$, or about 200 to about 6000 $cm^2$, or about 200 to about 5000 $cm^2$, or about 200 to about 4000 $cm^2$, or about 300 to about 15000 square $cm^2$, or about 300 to about 8000 $cm^2$, or about 300 to about 6000 $cm^2$, or about 300 to about 5000 $cm^2$, or about 300 to about 4000 $cm^2$.

The type of filter is dependent on the type of filtration employed. The types of filters include, by way of illustration and not limitation, hollow fiber filter cartridges (polysulfone, regenerated cellulose, mixed cellulose ester, polyethersulfone, polypropylene, polyvinylidene difluoride and polyester).

It is noteworthy that treatment with a chaotropic agent in accordance with the principles disclosed herein substantially enhances the ability of the polysaccharide that is non-covalently bound to the support to pass through a filter. It has been found that the present treatment can result in a reduction of the size of such polymer, a change in shape and/or increased permeability of the polymer. This may be explained more fully as follows: The presence of a chaotropic agent may be responsible for deaggregation of polysaccharide derivatives such as aldehydes that may have become aggregated. Heat exposure for extended periods of times is known to cause aggregation of molecules containing reactive groups such as aldehydes Another possible mode of action of a chaotropic agents may be the change in interactions of the polysaccharide with the membrane fibers by disruptions of the non-covalent bonds in the polysaccharide structure. These changes may allow increased permeability of the polysaccharide. In addition, presence of a chaotrop is expected to disrupt potential physical interactions of the support material containing covalently-coupled polysaccharide and non-specifically adsorbed polysaccharide thereby allowing increased solubility and hence permeability of this non-covalently polysaccharide through a diafiltration membrane. The phrase "substantially enhances" means that presence of a chaotrop causes a dramatic increase in the rate of separation of the non-covalently bound polysaccharide from a support material with covalently coupled polysaccharide. By the phrases "reduction of the size," "change in shape" and/or "increased permeability" is meant that self-aggregated polymerized forms of the polysaccharide, formed during reaction with the support material, would undergo de-aggregation resulting in the monomeric form of the polysaccharide. The monomeric and aggregated forms of the polysaccharide may attain different physical structures such as, for example, planar, linear, and globular. Some of these physical structures may not be permeable through a diafiltration membrane thereby limiting the extent of polysaccharide that could be removed even after extended periods of diafiltration. Without limitation to any particular theory of operation, presence of a chaotrop causes disruption of noncovalent interactions within the matrix of the polysaccharide making it amenable to forms that permeate through a membrane.

A support treated to remove non-covalently bound polysaccharide derivative may then used to prepare reagents for conducting an assay for an analyte. A reactive functionality or functional group on the support, which in many instances is a functional group of the polysaccharide derivative, may be employed to link an assay moiety to the support whereby the assay moiety becomes covalently bound to the support. The assay moiety may be a member of a specific binding pair (sbp), a member of a signal producing system (sps), for example. Functional groups on the assay moiety, e.g., sbp member or sps member, may be present naturally or may be introduced synthetically and include the functional groups mentioned above with regard to the support and the polysaccharide. Such functional groups include, for example, amine groups, hydroxyl groups, hydrazide groups, sulfhydryl groups, maleimido groups, and carboxyl groups.

In one example the polysaccharide derivative may comprise aldehyde groups, which can react with a corresponding functional group of the assay moiety. For example, the reaction between an aldehyde group and an sbp member may be by means of, for example, Schiff's base formation between an alkyl amine or an aryl amine of the assay moiety and the aldehyde group of the polysaccharide that is bound to the support. The reaction may be by means of reductive amination involving the aldehyde group and an amine group of the assay moiety. In one example, the aldehyde functionality may react with a corresponding amine group on the assay moiety whereby the assay moiety and the support become covalently bound.

As mentioned above, the support with bound assay moiety may be employed in an assay for determining one or both of the presence and amount of an analyte in a sample. A sample to be analyzed is obtained from a sample source. The sample to be tested may be non-biological or biological. "Non-biological samples" are those that do not relate to a biological material and include, for example, soil samples, water samples, air samples, samples of other gases and mineral samples. The phrase "biological sample" refers to any biological material such as, for example, body fluid, body tissue, body compounds and culture media. The sample may be a solid, semi-solid or a fluid (a liquid or a gas) from any source.

In some examples the sample may be a body excretion, a body aspirant, a body excisant or a body extractant. The body is usually that of a mammal and in some embodiments the body is a human body. Body excretions are those substances that are excreted from a body (although they also may be obtained by excision or extraction) such as, for example, urine, feces, stool, vaginal mucus, semen, tears, breath, sweat, blister fluid and inflammatory exudates. Body excisants are those materials that are excised from a body such as, for example, skin, hair and tissue samples including biopsies from organs and other body parts. Body aspirants are those materials that are aspirated from a body such as, for example, mucus, saliva and sputum. Body extractants are those materials that are extracted from a body such as, for example, whole blood, plasma, serum, spinal fluid, cerebral spinal fluid, lymphatic fluid, synovial fluid and peritoneal fluid.

The analyte is a substance of interest or the compound or composition to be detected and/or quantitated. Analytes include, by way of illustration and not limitation, therapeutic drugs, drugs of abuse, metabolites, pesticides, volatile organic compounds, semi-volatile organic compounds, non-volatile organic compounds, proteins, polysaccharides, pollutants, toxins, lipids and nucleic acids, (DNA, RNA), for example. The analyte is a substance of interest or the compound or composition to be detected and/or quantitated. Analytes include, for example, drugs, metabolites, pesticides and pollutants. Representative analytes, by way of illustration and not limitation, include alkaloids, steroids, lactams, aminoalkylbenzenes, benzheterocyclics, purines, drugs derived from marijuana, hormones, polypeptides which includes proteins, immunosuppressants, vitamins, prostaglandins, tricyclic antidepressants, anti-neoplastics, nucleosides and nucleotides including polynucleosides and polynucleotides, miscellaneous individual drugs which include methadone, meprobamate, serotonin, meperidine, lidocaine, procainamide, acetylprocainamide, propranolol, griseofulvin, valproic acid, butyrophenones, antihistamines, chloramphenicol, anticholinergic drugs, and metabolites and derivatives of all of the above. Also included are metabolites related to disease states, aminoglycosides, such as gentamicin, kanamicin, tobramycin, and amikacin, and pesticides such as, for example, polyhalogenated biphenyls, phosphate esters, thiophosphates, carbamates and polyhalogenated sulfenamides and their metabolites and derivatives. The term analyte also includes combinations of two or more of polypeptides and proteins, polysaccharides and nucleic acids. Such combinations include, for example, components of bacteria, viruses, chromosomes, genes, mitochondria, nuclei and cell membranes. Protein analytes include, for example, immunoglobulins, cytokines, enzymes, hormones, cancer antigens, nutritional markers and tissue specific antigens. Such proteins include, by way of illustration and not limitation, protamines, histones, albumins, globulins, scleroproteins, phosphoproteins, mucoproteins, chromoproteins, lipoproteins, nucleoproteins, glycoproteins, T-cell receptors, proteoglycans, HLA, unclassified proteins, e.g., somatotropin, prolactin, insulin, pepsin, proteins found in human plasma, blood clotting factors, protein hormones such as, e.g., follicle-stimulating hormone, luteinizing hormone, luteotropin, prolactin, chorionic gonadotropin, tissue hormones, cytokines, cancer antigens such as, e.g., PSA, CEA, α-fetoprotein, acid phosphatase, CA19.9, CA15.3 and CA125, tissue specific antigens, such as, e.g., alkaline phosphatase, myoglobin, CPK-MB and calcitonin, and peptide hormones. Other polymeric materials of interest are mucopolysaccharides and polysaccharides. As indicated above, the term analyte further includes oligonucleotide and polynucleotide analytes such as m-RNA, r-RNA, t-RNA, DNA and DNA-RNA duplexes, for example.

Representative drug analytes, by way of illustration and not limitation, include alkaloids, steroids, lactams, aminoalkylbenzenes, benzheterocyclics, purines, drugs derived from marijuana, hormones, polypeptides which includes proteins, immunosuppressants, vitamins, prostaglandins, tricyclic antidepressants, anti-neoplastics, nucleosides and nucleotides including polynucleosides and polynucleotides, miscellaneous individual drugs which include methadone, meprobamate, serotonin, meperidine, lidocaine, procainamide, acetylprocainamide, propranolol, griseofulvin, valproic acid, butyrophenones, antihistamines, chloramphenicol, anticholinergic drugs, and metabolites and derivatives of all of the above.

Also included within the term analyte are metabolites related to disease states, aminoglycosides, such as gentamicin, kanamicin, tobramycin, and amikacin, and pesticides such as, for example, polyhalogenated biphenyls, phosphate esters, thiophosphates, carbamates and polyhalogenated sulfenamides and their metabolites and derivatives.

The term analyte also includes combinations of two or more of polypeptides and proteins, polysaccharides and nucleic acids. Such combinations include, for example, components of bacteria, viruses, chromosomes, genes, mitochondria, nuclei and cell membranes. Protein analytes include, for example, immunoglobulins, cytokines, enzymes, hormones, cancer antigens, nutritional markers and tissue specific antigens. Such proteins include, by way of illustration and not limitation, protamines, histones, albumins, globulins, scleroproteins, phosphoproteins, mucoproteins, chromoproteins, lipoproteins, nucleoproteins, glycoproteins, T-cell receptors, proteoglycans, HLA, unclassified proteins, e.g., somatotropin, prolactin, insulin, pepsin, proteins found in human plasma, blood clotting factors, protein hormones such as, e.g., follicle-stimulating hormone, luteinizing hormone, luteotropin, prolactin, chorionic gonadotropin, tissue hormones, cytokines, cancer antigens such as, e.g., PSA, CEA, a-fetoprotein, acid phosphatase, CA19.9 and CA125, tissue specific antigens, such as, e.g., alkaline phosphatase, myoglobin, CPK-MB and calcitonin, and peptide hormones. Other polymeric materials of interest are mucopolysaccharides and polysaccharides. As indicated above, the term analyte further includes oligonucleotide and polynucleotide analytes such as m-RNA, r-RNA, t-RNA, DNA and DNA-RNA duplexes, for example.

The sample can be prepared in any convenient medium that does not interfere with an assay; an aqueous medium generally is employed. The assay comprises adding reagents for determining the presence or concentration of the analyte in the sample to a medium comprising the sample. In some examples the assay is an immunoassay and the reagents comprise at least one antibody for the analyte. An amount of a complex comprising the antibody for the analyte is measured. The phrase "complex comprising the antibody for the analyte" refers to a complex wherein the antibody for the analyte is complexed to one or more substances that may be one or more of the analyte and other substances in a sample that bind to the antibody for the analyte.

Any suitable assay may be employed for determining the analyte as long as such assay utilizes a support in the determination. The assays are conducted by combining the sample with reagents for determining the amount of the analyte in the sample. The nature of the reagents is dependent on the particular type of assay to be performed. The assay may be an immunoassay or a non-immunoassay. Various assay methods are discussed below by way of illustration and not limitation.

General Description of Assays for an Analyte

The following discussion is by way of illustration and not limitation. The supports produced in accordance with the principles described herein may be employed in any assay that employs a support reagent. In many examples the reagents comprise at least one antibody for the analyte and the assay is generally referred to as an immunoassay as distinguished from assays that do not utilize an antibody, which are referred to as non-immunoassays. By the phrase "antibody for the analyte" is meant an antibody that binds specifically to the analyte (and in some instances to closely related structural analogs of the analyte such as metabolites of the analyte) and does not bind to any significant degree to other substances that would distort the analysis for the analyte.

Immunoassays may involve labeled or non-labeled reagents. Immunoassays involving non-labeled reagents usually comprise the formation of relatively large complexes involving one or more antibodies. Such assays include, for example, immunoprecipitin and agglutination methods and corresponding light scattering techniques such as, e.g., nephelometry and turbidimetry, for the detection of antibody complexes. Labeled immunoassays include chemiluminescence immunoassays, enzyme immunoassays, fluorescence polarization immunoassays, radioimmunoassay, inhibition assay, induced luminescence, fluorescent oxygen channeling assay, and so forth.

One general group of immunoassays that may be employed includes immunoassays using a limited concentration of antibody. Another group of immunoassays involves the use of an excess of one or more of the principal reagents such as, for example, an excess of an antibody for the analyte. Another group of immunoassays are separation-free homogeneous assays in which the labeled reagents modulate the label signal upon analyte-antibody binding reactions. Another group of assays includes labeled antibody reagent limited competitive assays for analyte that avoid the use of problematic labeled haptens. In this type of assay, a solid phase immobilized analyte is present in a constant, limited amount. The partition of a label between the immobilized analyte and free analyte depends on the concentration of analyte in the sample.

Antibodies specific for an analyte for use in immunoassays can be monoclonal or polyclonal. Such antibodies can be prepared by techniques that are well known in the art such as immunization of a host and collection of sera (polyclonal) or by preparing continuous hybrid cell lines and collecting the secreted protein (monoclonal) or by cloning and expressing nucleotide sequences or mutagenized versions thereof coding at least for the amino acid sequences required for specific binding of natural antibodies.

Antibodies may include a complete immunoglobulin or fragment thereof, which immunoglobulins include the various classes and isotypes, such as IgA, IgD, IgE, IgG1, IgG2a, IgG2b and IgG3, IgM, etc. Fragments thereof may include Fab, Fv and F(ab')$_2$, Fab', and the like. In addition, aggregates, polymers, and conjugates of immunoglobulins or their fragments can be used where appropriate so long as binding affinity for a particular molecule is maintained.

As discussed above, an antibody selected for use in an immunoassay for an analyte, for example, should specifically and preferentially bind the analyte (and its pharmaceutically active metabolites, if necessary or desired) over other ligands such as other metabolites or related substances.

Other reagents are included in the assay medium depending on the nature of the assay to be conducted. Such assays usually involve reactions between binding partners such as an analyte and a corresponding antibody or the binding between an antibody and a corresponding binding partner such as a second antibody that binds to the first antibody. Accordingly, the binding partner may be a protein, which may be an antibody or an antigen. The binding partner may be an sbp member, which is one of two different molecules, having an area on the surface or in a cavity, which specifically binds to and is thereby defined as complementary with a particular spatial and polar organization of the other molecule. The sbp members in many instances are members of an immunological pair such as antigen-antibody, although other specific binding pairs such as, for example, biotin-avidin, hormones-hormone receptors, enzyme-substrate, nucleic acid duplexes, IgG-protein A, and polynucleotide pairs such as DNA-DNA, DNA-RNA, are not immunological pairs but are included within the scope of sbp member.

Accordingly, specific binding involves the specific recognition of one of two different molecules for the other compared to substantially less recognition of other molecules. On the other hand, non-specific binding involves non-covalent binding between molecules that is relatively independent of specific surface structures. Non-specific binding may result from several factors including hydrophobic interactions between molecules. In many embodiments of assays, preferred binding partners are antibodies and the assays are referred to as immunoassays.

The immunoassays may involve labeled reagents and such assays include, for example, enzyme immunoassays, fluorescence polarization immunoassays, radioimmunoassay, inhibition assay, induced luminescence, fluorescent oxygen channeling assay, and so forth.

The assays can be performed either without separation (homogeneous) or with separation (heterogeneous) of any of the assay components or products. Homogeneous immunoassays are exemplified by the EMIT® assay (Siemens Healthcare Diagnostics Inc., Newark Del.) disclosed in Rubenstein, et al., U.S. Pat. No. 3,817,837, column 3, line 6 to column 6, line 64; immunofluorescence methods such as those disclosed in Ullman, et al., U.S. Pat. No. 3,996,345, column 17, line 59, to column 23, line 25; enzyme channeling immunoassays ("ECIA") such as those disclosed in Maggio, et al., U.S. Pat. No. 4,233,402, column 6, line 25 to column 9, line 63; the fluorescence polarization immunoassay ("FPIA") as disclosed, for example, in, among others, U.S. Pat. No. 5,354, 693; and so forth.

In a homogeneous assay, after all of the reagents have been combined, the signal is determined and related to the amount of analyte in the sample. For example, in an EMIT® assay for an analyte, a sample suspected of containing the analyte is combined in an aqueous medium either simultaneously or sequentially with an enzyme conjugate of the analyte, i.e., an analog of the analyte, and antibody capable of recognizing the analyte. Generally, a substrate for the enzyme is added, which results in the formation of a chromogenic or fluorogenic product upon enzyme catalyzed reaction. Preferred enzymes are glucose-6-phosphate dehydrogenase and alkaline phosphatase but other enzymes may be employed. The analyte (and/or other substances in the sample that might bind to the antibody) and the moieties of the enzyme conjugate compete for binding sites on the antibody. The enzyme activity in the medium is then measured, usually by spectrophotometric means. Calibrators may also be tested in a manner similar to the testing of the sample suspected of containing the analyte. The calibrators typically contain differing, but known, concentrations of the analyte to be determined. Preferably, the concentration ranges present in the calibrators span the range of suspected analyte concentrations in unknown samples.

The aforementioned assays may be carried out using mutant glucose-6-phosphate dehydrogenase as the enzyme of the enzyme conjugate. This mutant enzyme is described in U.S. Pat. Nos. 6,090,567 and 6,033,890, the relevant disclosures of which are incorporated herein by reference. Furthermore, the assay may be conducted using antibodies for the analyte and using procedures as disclosed in U.S. Pat. Nos. 5,328,828 and 5,135,863, the relevant disclosures of which are incorporated herein by reference.

Other enzyme immunoassays are the radial partition immunoassays (RPIA) described by Giegel, et al., Clin. Chem. (1982) 28: 1894; the enzyme modulate mediated immunoassay ("EMMIA") discussed by Ngo and Lenhoff, FEBS Lett. (1980) 116:285-288; the substrate labeled fluorescence immunoassay ("SLFIA") disclosed by Oellerich, J. Clin. Chem. Clin. Biochem. (1984) 22:895-904; the combined enzyme donor immunoassays ("CEDIA") disclosed by Khanna, et al., Clin. Chem. Acta (1989) 185:231-240; homogeneous particle labeled immunoassays such as particle enhanced turbidimetric inhibition immunoassays ("PETINIA"), particle enhanced turbidimetric immunoassay ("PETIA"), etc.; and the like.

Other assays include the sol particle immunoassay ("SPIA"), the disperse dye immunoassay ("DIA"); the metalloimmunoassay ("MIA"); the enzyme membrane immunoassays ("EMIA"); luminoimmunoassays ("LIA"); acridinium ester label immunoassays using paramagnetic particles as a solid phase (ADVIA Centaur immunoassays); and so forth. Other types of assays include immunosensor assays involving the monitoring of the changes in the optical, acoustic and electrical properties of an antibody-immobilized surface upon the binding of a drug. Such assays include, for example, optical immunosensor assays, acoustic immunosensor assays, semiconductor immunosensor assays, electrochemical transducer immunosensor assays, potentiometric immunosensor assays, amperometric electrode assays, and the like.

In many of the assays discussed herein for determination of an analyte, a label is employed; the label is usually part of a signal producing system. The nature of the label is dependent on the particular assay format. A signal producing system may include one or more components, at least one component being a detectable label, which generates a detectable signal that relates to the amount of one or both of bound and unbound label, i.e. the amount of label bound or not bound to the analyte being detected or to an agent that reflects the amount of the analyte to be detected. The label is any molecule that produces or can be induced to produce a signal, and may be, for example, a fluorescer, radiolabel, enzyme, chemiluminescer or photosensitizer. Thus, the signal is detected and/or measured by detecting enzyme activity, luminescence, light absorbance or radioactivity, for example, as the case may be.

Suitable labels include, by way of illustration and not limitation, enzymes such as alkaline phosphatase, glucose-6-phosphate dehydrogenase ("G6PDH") and horseradish peroxidase; ribozyme; a substrate for a replicase such as QB replicase; promoters; dyes; fluorescers, such as fluorescein isothiocyanate, rhodamine compounds, phycoerythrin, phycocyanin, allophycocyanin, o-phthaldehyde, and fluorescamine; complexes such as those prepared from CdSe and ZnS present in semiconductor nanocrystals known as Quantum dots; chemiluminescers such as isoluminol and acridinium esters, for example; sensitizers; coenzymes; enzyme substrates; radiolabels such as $^{125}I$, $^{131}I$, $^{14}C$, $^{3}H$, $^{57}Co$ and $^{75}Se$; particles such as latex particles, carbon particles, metal particles including magnetic particles, e.g., chromium dioxide ($CrO_2$) particles, and the like; metal sol; crystallite; liposomes; cells, etc., which may be further labeled with a dye, catalyst or other detectable group. Suitable enzymes and coenzymes are disclosed in Litman, et al., U.S. Pat. No. 4,275,149, columns 19-28, and Boguslaski, et al., U.S. Pat. No. 4,318,980, columns 10-14; suitable fluorescers and chemiluminescers are disclosed in Litman, et al., U.S. Pat. No. 4,275,149, at columns 30 and 31; which are incorporated herein by reference.

The label can directly produce a signal and, therefore, additional components are not required to produce a signal. Numerous organic molecules, for example fluorescers, are able to absorb ultraviolet and visible light, where the light absorption transfers energy to these molecules and elevates them to an excited energy state. This absorbed energy is then dissipated by emission of light at a second wavelength. Other labels that directly produce a signal include radioactive isotopes and dyes.

Alternately, the label may need other components to produce a signal, and the signal producing system would then include all the components required to produce a measurable signal. Such other components may include substrates, coenzymes, enhancers, additional enzymes, substances that react with enzymic products, catalysts, activators, cofactors, inhibitors, scavengers, metal ions, and a specific binding substance required for binding of signal generating substances.

The sps member is associated with the support. The manner of association of the sps member with the support depends on one or more of the nature of the support, the nature of the sps member, the surface area and porosity of the support and the nature of any solvent employed, for example. The association may be by adsorption of the sps member by the support, covalent bonding of the sps member to the support, for example, by covalent attachment to a functional group of the polysaccharide on the support, dissolution or dispersion of the sps member in the support, non-covalent bonding of the sps member to the support by means of binding pair members (e.g., avidin-biotin and digoxin-antibody for digoxin), for example. In this manner the sps member is "associated with" the solid support.

As used herein, the phrase "associated with" includes covalent binding of one moiety to another moiety either by a direct bond or through a spacer group, non-covalent binding of one moiety to another moiety either directly or by means of specific binding pair members bound to the moieties, incorporation of one moiety into another moiety such as by dissolving one moiety in another moiety or by synthesis, and coating one moiety on another moiety, for example. Association of an sps member such as, for example, a sensitizer or a chemiluminescent compound, with latex particles may involve incorporation during formation of the particles by polymerization, or incorporation into preformed particles, e.g., by non-covalent dissolution into the particles, for example.

As mentioned above, depending on the type of assay format, the label or other sps members can be bound to the support. In some examples, one or both of the label and sps member may be bound to an sbp member or another molecule. For example, the label can be bound covalently to an sbp member such as, for example, an antibody, a receptor for an antibody, a receptor that is capable of binding to a small molecule conjugated to an antibody, or a ligand (analyte) analog. Bonding of the label to the sbp member may be accomplished by chemical reactions that result in replacing a hydrogen atom of the label with a bond to the sbp member or may include a linking group between the label and the sbp member. *Other* sps members may also be bound covalently to sbp members. For example, two sps members such as a fluorescer and quencher can each be bound to a different antibody that forms a specific complex with the analyte. Formation of the complex brings the fluorescer and quencher in close proximity, thus permitting the quencher to interact with the fluorescer to produce a signal. Methods of conjugation are well known in the art. See, for example, Rubenstein, et al., U.S. Pat. No. 3,817,837, incorporated herein by reference.

Enzymes of particular interest as label proteins are redox enzymes, particularly dehydrogenases such as glucose-6-phosphate dehydrogenase, lactate dehydrogenase, etc., and enzymes that involve the production of hydrogen peroxide and the use of the hydrogen peroxide to oxidize a dye precursor to a dye. Particular combinations include saccharide oxidases, e.g., glucose and galactose oxidase, or heterocyclic oxidases, such as uricase and xanthine oxidase, coupled with an enzyme which employs the hydrogen peroxide to oxidize a dye precursor, that is, a peroxidase such as horse radish peroxidase, lactoperoxidase, or microperoxidase. Additional enzyme combinations are known in the art. When a single enzyme is used as a label, other enzymes may find use such as hydrolases, transferases, and oxidoreductases, preferably hydrolases such as alkaline phosphatase and beta-galactosidase. Alternatively, luciferases may be used such as firefly luciferase and bacterial luciferase.

Illustrative co-enzymes that find use include NAD[H], NADP[H], pyridoxal phosphate, FAD[H], FMN[H], etc., usually coenzymes involving cycling reactions. See, for example, U.S. Pat. No. 4,318,980, the disclosure of which is incorporated herein by reference.

The term "non-poly(amino acid) labels" includes those labels that are not proteins (e.g., enzymes). The non-poly (amino acid) label is capable of being detected directly or is detectable through a specific binding reaction that produces a detectable signal. The non-poly(amino acid) labels include, for example, radioisotopes, luminescent compounds, supports, e.g., particles, plates, beads, etc., polynucleotides, and the like. More particularly, the non-poly(amino acid) label can be isotopic or non-isotopic, usually non-isotopic, and can be a polynucleotide coding for a catalyst, promoter, dye, coenzyme, enzyme substrate, radioactive group, a small organic molecule (including, e.g., biotin, fluorescent molecules, chemiluminescent molecules, and the like), amplifiable polynucleotide sequence, a support such as, for example, a particle such as latex or carbon particle or chromium dioxide (chrome) particle or the like, metal sol, crystallite, liposome, cell, etc., which may or may not be further labeled with a dye, catalyst or other detectable group, and the like.

In a typical competitive heterogeneous assay, an example of a support treated in accordance with the principles described herein and further comprising an sbp member that binds to an analyte is contacted with a medium containing the sample suspected of containing the analyte and the analyte conjugated to a label that is reactive with the sps member of the present composition or with a product of the activation of the sps member. Activation of the sps member on the support produces a signal from the label if the analyte is present, which is determined by conventional techniques and is related to the amount of the analyte in the sample.

In a typical non-competitive sandwich assay, an immune sandwich complex is formed in an assay medium. The complex comprises the analyte, an sbp member (first sbp member) covalently attached to a support treated in accordance with the principles described herein, and a second sbp member that binds to the analyte or to the first sbp member. Subsequently, the immune sandwich complex is detected and is related to the amount of analyte in the sample. The immune sandwich complex is detected by virtue of the presence in the complex of one or more of a label of the support and a label of the second sbp member.

Some known assays utilize a signal producing system that employs first and second sps members. The sps members may be related in that activation of one member of the sps produces a product such as, e.g., light, which results in activation of another member of the sps. In one approach in a sandwich assay, a first incubation is carried out using a support with an sbp member for the analyte attached thereto, which is contacted with a medium containing a sample suspected of containing the analyte. After a wash and separation step, the support of the present composition is contacted with a medium containing a second sbp member such as, for example, an antibody for the analyte, which contains a label such as an enzyme, for a second incubation period. The labels are related in that activation of one of the labels activates the other label if the analyte is present in the medium. The support is again washed and separated from the medium and either the medium or the support is examined for the presence of a signal. The presence and amount of signal is related to the presence or amount of the analyte.

In a variation of the above sandwich assay, the sample suspected of containing the analyte in a suitable medium is contacted with labeled antibody for the analyte and incubated for a period of time. Then, the medium is contacted with a support treated in accordance with the principles described herein, which comprises a label that is related to the label of the labeled antibody as discussed above. After an incubation period, the support is separated from the medium and washed to remove unbound reagents. The support or the medium is examined for the presence of a signal, which is related to the presence or amount of analyte. In another variation of the above, the sample, the support and the labeled antibody are combined in a medium and incubated in a single incubation step. Separation, wash steps and examination for signal are as described above.

In some embodiments of known assays, the sps members comprise a sensitizer such as, for example, a photosensitizer, and a chemiluminescent composition where activation of the sensitizer results in a product that activates the chemiluminescent composition. The second sps member usually generates a detectable signal that relates to the amount of bound and/or unbound sps member, i.e. the amount of sps member bound or not bound to the analyte being detected or to an agent that reflects the amount of the analyte to be detected. In accordance with the principles described herein, the support may comprise one of either the sensitizer reagent or the chemiluminescent reagent.

In one embodiment the assay is an induced luminescence immunoassay, which is described in U.S. Pat. No. 5,340,716 (Ullman, et al.) entitled "Assay Method Utilizing Photoactivated Chemiluminescent Label" ("induced luminescence assay"), which disclosure is incorporated herein by reference. In one approach the assay uses a particle incorporating a photosensitizer and a label particle incorporating a chemiluminescent compound. One or both of the particles may be coated with a polysaccharide where the particles were prepared in accordance with the principles disclosed herein. The label particle may be conjugated to an sbp member, for example, an antibody for the analyte that is capable of binding to the analyte to form a complex, or to a second sbp member to form a complex, in relation to the amount of the analyte. If the analyte is present, the photosensitizer and the chemiluminescent compound come into close proximity. The photosensitizer generates singlet oxygen and activates the chemiluminescent compound when the two labels are in close proximity.

The activated chemiluminescent compound subsequently produces light. The amount of light produced is related to the amount of the complex formed, which comprises antibody for the analyte.

By way of further illustration, chemiluminescent particles may be employed, which comprise the chemiluminescent compound associated therewith such as by incorporation therein or attachment thereto. An sbp member that binds to the analyte, such as, for example, an antibody for analyte, is bound to a polysaccharide coating the particles, which are prepared in accordance with the principles disclosed herein. A second sbp member that binds to the analyte is part of a biotin conjugate. Streptavidin is conjugated to a second set of particles having a photosensitizer associated therewith. The binding of the streptavidin to this second set of particles (photosensitizer particles) may or may not involve a polysaccharide on the particles. The chemiluminescent particles are mixed with the respective portion of the sample suspected of containing an analyte and with the photosensitizer particles. With regard to the first portion of the sample, the reaction medium is incubated to allow the particles to bind to substances or components in the sample other than analyte. With regard to the second portion of the sample, the reaction medium is incubated to allow the particles to bind to the analyte by virtue of the binding of the sbp members to the analyte. Then, the medium is irradiated with light to excite the photosensitizer, which is capable in its excited state of activating oxygen to a singlet state. Because the chemiluminescent compound of one of the sets of particles is now in close proximity to the photosensitizer by virtue of the presence of the substances and/or the analyte, it is activated by singlet oxygen and emits luminescence. The medium is then examined for the amount of luminescence or light emitted, the presence thereof being related to the amount of the substances that bind to antibody for the analyte or the amount of analyte.

Another particular example of an assay that may be employed for the determination of an analyte is discussed in U.S. Pat. No. 5,616,719 (Davalian, et al.), which describes fluorescent oxygen channeling immunoassays.

The assays discussed above are normally carried out in an aqueous buffered medium at a moderate pH, generally that which provides optimum assay sensitivity. The pH for the assay medium will usually be in the range of about 4 to about 11, or in the range of about 5 to about 10, or in the range of about 6.5 to about 9.5. The pH will usually be a compromise among one or more of optimum binding of the binding members of any specific binding pairs and the pH optimum for other reagents of the assay such as members of a signal producing system, for example.

Various buffers may be used to achieve the desired pH and maintain the pH during the determination. Illustrative buffers include borate, phosphate, carbonate, tris, barbital and the like. The particular buffer employed is not critical, but in an individual assay one or another buffer may be preferred. Various ancillary materials may be employed in the above methods. For example, in addition to buffers the medium may comprise stabilizers for the medium and for the reagents employed. In some embodiments, in addition to these additives, proteins may be included, such as albumins; quaternary ammonium salts; polyanions such as dextran sulfate; binding enhancers, or the like. All of the above materials are present in a concentration or amount sufficient to achieve the desired effect or function.

One or more incubation periods may be applied to the medium at one or more intervals including any intervals between additions of various reagents mentioned above. The medium is usually incubated at a temperature and for a time sufficient for binding of various components of the reagents to occur. Moderate temperatures are normally employed for carrying out the method and usually constant temperature, preferably, room temperature, during the period of the measurement. Incubation temperatures normally range from about 5° to about 99° C., or from about 15° C. to about 70° C., or about 20° C. to about 45° C., for example. The time period for the incubation is about 0.2 seconds to about 24 hours, or about 1 second to about 6 hours, or about 2 seconds to about 1 hour, or about 1 minute to about 15 minutes, for example. The time period depends on the temperature of the medium and the rate of binding of the various reagents. Temperatures during measurements will generally range from about 10 to about 50° C., or from about 15 to about 40° C.

The concentration of analyte that may be assayed generally varies from about $10^{-5}$ to about $10^{-17}$ M, or from about $10^{-6}$ to about $10^{-14}$ M. Considerations, such as whether the assay is qualitative, semi-quantitative or quantitative (relative to the amount of erythrocytophilic drug analyte present in the sample), the particular detection technique and the concentration of the analyte normally determine the concentrations of the various reagents.

The concentrations of the various reagents in the assay medium will generally be determined by one or more of the concentration range of interest of the analyte, the nature of the assay, the antibody affinity and avidity and antibody fragmentation, for example. However, the final concentration of each of the reagents is normally determined empirically to optimize the sensitivity of the assay over the range. That is, a variation in concentration of analyte that is of significance should provide an accurately measurable signal difference. Considerations such as the nature of a signal producing system and the nature of the analyte normally determine the concentrations of the various reagents.

While the order of addition may be varied widely, there will be certain preferences depending on the nature of the assay. The simplest order of addition is to add all the materials simultaneously and determine the effect that the assay medium has on the signal as in a homogeneous assay. Alternatively, the reagents can be combined sequentially. Optionally, an incubation step may be involved subsequent to each addition as discussed above.

Examination Step

In a next step of an assay method, the medium is examined for the presence of a complex comprising the analyte. One or both of the presence and amount of the complex indicates one or both of the presence and amount of the analyte in the sample. The phrase "measuring the amount of an analyte" refers to the quantitative, semi-quantitative and qualitative determination of the analyte. Methods that are quantitative, semi-quantitative and qualitative, as well as all other methods for determining the analyte, are considered to be methods of measuring the amount of the analyte. For example, a method, which merely detects the presence or absence of the analyte in a sample suspected of containing the analyte, is considered to be included within the scope of the examination step. The terms "detecting" and "determining," as well as other common synonyms for measuring, are contemplated within the scope of the present embodiments.

In many instances the examination of the medium involves detection of a signal from the medium. The amount of the signal is related to the amount of the analyte in the sample. The particular mode of detection depends on the nature of the signal producing system. As discussed herein, there are numerous methods by which a label of a signal producing system can produce a signal detectable by external means, desirably by visual examination, and include, for example, electromagnetic radiation, electrochemistry, heat, radioactivity detection, chemical reagents and so forth.

Activation of a signal producing system depends on the nature of the sps members. For those sps members that are activated with light, the member is irradiated with light. For sps members that are on the surface of a particle, for example, addition of a base may result in activation. Other activation methods will be suggested to those skilled in the art in view of the disclosures herein. For some signal producing systems, no agent for activation is necessary such as those systems that involve a label that is a radioactive label, an enzyme, and so forth. For enzyme systems, addition of a substrate and/or a cofactor may be necessary.

The examination for amount of the signal also includes the detection of the signal, which is generally merely a step in which the signal is read. Luminescence or light produced from any label can be measured visually, photographically, actinometrically, spectrophotometrically or by any other convenient means to determine the amount thereof, which is related to the amount of analyte in the medium. In some instances, the signal is read using an instrument, the nature of which depends on the nature of the signal. The instrument may be a spectrophotometer, fluorometer, absorption spectrometer, luminometer, chemiluminometer, actinometer, scintillation counter, or a photographic instrument, for example. The amount of signal detected is related to the amount of the analyte present in a sample. Temperatures during measurements generally range from about 10° to about 70° C., or from about 20° to about 45° C., or about 20° to about 25° C., for example. In one approach standard curves are formed using known concentrations of the analytes to be screened. As discussed herein, calibrators and other controls may also be used.

Kits for Conducting Assays on the Sample Portions

The reagents for conducting a particular assay may be present in a kit useful for conveniently performing an assay for the determination of an analyte. In one example, a kit comprises in packaged combination reagents for conducting an assay for the analyte, which may include an antibody for an analyte and other reagents for performing an assay, the nature of which depend upon the particular assay format and further include support reagents in accordance with the principles described herein. The reagents may each be in separate containers or various reagents can be combined in one or more containers depending on the cross-reactivity and stability of the reagents. The kit can further include other separately packaged reagents for conducting an assay such as additional sbp members, ancillary reagents such as an ancillary enzyme substrate, and so forth.

The relative amounts of the various reagents in the kits can be varied widely to provide for concentrations of the reagents that substantially optimize the reactions that need to occur during the present method and further to optimize substantially the sensitivity of the assay. Under appropriate circumstances one or more of the reagents in the kit can be provided as a dry powder, usually lyophilized, including excipients, which on dissolution will provide for a reagent solution having the appropriate concentrations for performing a method or assay. The kit can further include a written description of a method in accordance with the present embodiments as described above.

DEFINITIONS

The following definitions are provided for terms and phrases not otherwise specifically defined above.

The phrase "at least" as used herein means that the number of specified items may be equal to or greater than the number recited.

The phrase "about" as used herein means that the number recited may differ by plus or minus 10%; for example, "about 5" means a range of 4.5 to 5.5.

The designations "first" and "second" are used solely for the purpose of differentiating between two items such as, for example, "first sps member" and "second sps member," and are not meant to imply any sequence or order or importance to one item over another or any order of addition, for example.

The following examples further describe the specific examples of the invention by way of illustration and not limitation and are intended to describe and not to limit the scope of the invention. Parts and percentages disclosed herein are by volume unless otherwise indicated.

EXAMPLES

All chemicals may be purchased from the Sigma-Aldrich Company (St. Louis Mo.) unless otherwise noted.

ABBREVIATIONS

Dyed Chemibeads: Carboxyl modified polystyrene latex particle comprising a chemiluminescent compound (chelated europium and thioxene) and prepared in a manner such as described in U.S. Pat. Nos. 5,811,311 and 6,406,667, the relevant disclosures of which is incorporated herein by reference.

Sensitizer beads: Carboxyl modified polystyrene latex particle comprising a photosensitizer compound (bis-(trihexyl)-silicon-t-butyl-phthalocyanine) and prepared using a method analogous to that described in U.S. Pat. Nos. 6,153,442, 7,022,529, 7,229,842 and U.S. Patent Application Publication No. 20050118727A, the relevant disclosures of which are incorporated herein by reference.

Acetate buffer: 100 mM sodium acetate pH 5.0

Amdex: Amine-modified dextran

APRM: Dyed chemibeads chemically conjugated with Amdex

Borate buffer: 15 mM sodium borate pH 9.0

Borate-GAFAC buffer: 15 mM sodium borate-0.1% GAFAC, pH 9.1.

Dexal: Aldehyde-modified dextran

EDC: N-(3-Dimethylaminopropyl)-N'-ethylcarbodiimide hydrochloride

EPRM: APRM chemically conjugated with Dexal

GAFAC: Commercially available surfactant from GAF Corporation (Wayne N.J.)

High pH wash buffer: 5.56 mM sodium triphosphate, 4.44 mM sodium bicarbonate pH 11.0

LOCI: luminescent oxygen channeling immunoassay (induced luminescence assay)

MES: 2-(N-morpholino)ethanesulfonic acid

SDS: Sodium dodecyl sulfate TAPS: N-(tris(hydroxymethyl)methyl)-3-aminopropanesulfonic acid.

Example 1

Removal of Non-Covalently Bound Amdex from Chemibead Particles with Various Buffer Compositions Containing Chaotropic Agents Dyed chemibeads (2.7 g) were suspended in 137.5 mL of 50 mM MES buffer pH 6.0. To this suspension was added 0.55 g Amdex dissolved in 137.5 mL of 50 mM MES buffer pH 6.0 and the suspension was stirred with a magnetic stir bar to allow mixing. Then, 0.55 g EDC in 13 mL water was added and the suspension stirred at 25° C. for 2 hrs. The resulting suspension of Amdex-coupled chemibeads, i.e., APRM, was placed in a reservoir and diluted with 1000 mL of 0.6 M chaotropic salt solution. The APRM suspension was concentrated to 100 mL by passing through a polysulfone hollow fiber filter cartridge having pore size of 0.2 microns and surface area of 420 cm$^2$ (Amersham Bioscience CFP-2-E-4A, Piscataway N.J.). APRM suspension was passed through the cartridge using a peristaltic pump. The permeate passing through the pores of the cartridge was collected and retentate suspension of APRM was circulated back to the reservoir. This was continued till APRM suspension in the reservoir was concentrated to about 50 mL. At the end of each washing, anthrone test was performed on supernatant (APRM suspension, 20 mg/mL). The bead suspension was centrifuged at 15,000 rpm for 30 min and the supernatant solution collected was filtered through a 0.1 micron filter to determine the amount of Amdex. Washing was continued with sequential additions of the chaotropic agent solutions until Amdex in supernatant was reduced to <15 μg/mL for dextran content in the supernatant solution. Table 1 summarizes the results for dextran content in the supernatant solution, which relates to the dextran content remaining on the chemibeads as discussed above. The results demonstrate the efficiency of chaotropic agents in removal of non-covalently bound Amdex from the chemibeads.

TABLE 1

| Chaotropic agent | Volume (mL) | No. washes | Amdex content (μg/mL) |
|---|---|---|---|
| 0.6M Ammonium thiocyanate | 1000 | 3 | 100 |
| 0.6M Ammonium thiocyanate-2.5% (w/v) sodium dodecyl sulfate | 1000 | 3 | 60 |
| 0.6M sodium trichloroacetate | 600 | 1.5 | ≦15 |

Example 2

Removal of Non-Covalently Bound Dexal from Sensitizer Particles with Various Buffer Compositions Containing Chaotropic Agents A mixture of 12 mL sensitizer beads (26.4 mg/mL of 1 mM TAPS buffer) containing reactive hydrazide groups, 13 mL dextran aldehyde (50 mg/mL of 10 mM phosphate, pH 7.0) and 3.25 mL of 0.5 M sodium acetate, pH 5.0 was heated at 50° C. for 24 hrs. For diafiltration studies with different independent buffer systems containing chaotropic agents, 2 mL of this cooled reaction mixture was diluted with 2 mL of 0.3 M TAPS, pH 8.0 buffer followed by diafiltration with the specific buffer system. Diafiltration studies were carried out by employing a 0.1μ membrane (mixed cellulose ester, 155 cm$^2$ surface area, Spectrum Laboratories, Los Angeles, Calif.) as described in Example 1. For each buffer system studied, 200 mL of the permeate was collected and retentate bead suspension was centrifuged at 15,000 rpm for 30 min. Supernatant solution, separated from the particles, was filtered through a 0.1μ filter and analyzed for its dextran content by anthrone test. Results are described in Table 2, which demonstrates the efficiency of chaotropic agents in removal of non-covalently bound dexal from sensitizer beads.

TABLE 2

| Chaotropic agent | No. washes | Dexal content (mg/mL) |
|---|---|---|
| 15 mM Borate, pH 9.0 | — | 4.25 |
| 15 mM Borate-0.1% GAFAC, pH 9.0 | — | 2.26 |
| 20 mM TAPS-0.1% SDS, pH 8.0 | — | 2.08 |
| 50 mM TAPS-0.2M NH$_4$SCN, pH 8.0 | — | 1.86 |
| 20 mM TAPS-0.2M Sodium trichloroacetate, pH 8.0 | — | 1.49 |

Example 3

Removal of Non-Covalently Bound Dexal from Dexal-Coated Sensibeads in the Absence of Chaotropic Agents This experiment is not in accordance with the present embodiments and is provided for purposes of comparison.

A crude reaction mixture containing 1.5 g dexal-coated sensibeads (Example 2) and dexal was suspended in 450 mL of borate-GAFAC buffer, in a reservoir. To this, 450 mL borate-GAFAC buffer was added. This mixture was subjected to diafiltration as described in Example 1 by employing a polysulfone hollow fiber filter cartridge having pore size of 0.2 microns and surface area of 420 cm$^2$ (Amersham Bioscience CFP-2-E-4A). The permeate passing through the pores of the cartridge was collected and retentate suspension of dexal-coated sensibeads was circulated back to the reservoir. This was continued till suspension in the reservoir was concentrated to about 225 mL. Then 2025 mL of borate-GAFAC buffer was added to the reservoir and the procedure of washing was repeated till suspension in the reservoir was concentrated to 50-100 mL. Samples of permeate and washed dexal-coated sensibeads were collected at different wash volumes. This diafiltration was continued with 10× wash volumes of borate-GAFAC buffer, 5× wash volumes of borate buffer and 10× wash volumes of the acetate buffer. For each buffer system anthrone test was performed on dexal-coated sensibeads as well as on supernatant (sensibeads suspension (20 mg/mL) was centrifuged at 15,000 rpm for 30 min and the supernatant solution collected was filtered through a 0.1μ filter), and on permeate to determine the amount of dexal. Table 3 summarizes the data for dexal found in the supernatant (non-covalently bound to sensitizer particles) and permeate at the end of a given wash volume.

TABLE 3

| Wash Volumes | Non-covalently bound dexal (μg/mL) (estimated as dextran) | |
|---|---|---|
| | Supernatant | Permeate |
| 5X borate-GAFAC | >250* | 87 |
| 10X borate-GAFAC | >250 | 98 |
| 5X borate | >250 | 81 |
| 5X acetate | >250 | 146 |
| 10X acetate | >250 | 72 |

*greater than the highest dextran standard used in anthrone assay.

Example 4

Removal of Non-Covalently Bound Dexal from Sensitizer Beads with Buffer Containing Sodium Trifluoroacetate A mixture of 10.68 L sensitizer beads (20 mg/mL of 1 mM TAPS buffer) containing reactive hydrazide groups, 10.68 L dextran aldehyde (40 mg/mL in a mixture containing 8.5 L of 10 mM phosphate, pH 7.0 and 2.17 L of 0.5 M sodium acetate, pH 5.0) was heated at 50° C. for 20 hrs. Dextran aldehyde employed from this reaction was prepared from 500 kDa dextran. A sample (10 L) of this crude reaction mixture, containing 10 mg/mL sensitizer particles, was mixed with a solution of 0.6 M sodium trifluoroacetate (TFA; 20 L) in borate-GAFAC buffer, preheated at 37° C. for 20 hrs. Mixture was stirred at room temperature for 30 min and then stored for 20 hrs at 4° C. The suspension was placed in a container and subjected to diafiltration as described in Example 1. A polysulfone hollow fiber filter cartridge having pore size of 0.2 microns and surface area of 9200 cm$^2$ (Amersham Bioscience CFP-2-E-8A) was employed for diafiltration studies. Diafiltration was carried out by maintaining a constant volume containing the suspended particles at 3 mg/mL for the first cycle and then at 6 mg/mL for subsequent cycles. Amount of buffer lost from the suspended particles during diafiltration was compensated with fresh volumes of 0.4 M TFA in the borate-GAFAC buffer. This was continued until 33.3 L of the permeate was collected for the first cycle followed by a collection of 16.7 L of the permeate for the subsequent cycles. At the end of each cycle, anthrone test was performed to quantitate the amount of dextran derivative present in the permeate and the supernatant solution. A sample of the sensitizer particles, present in the retentate, was centrifuged at 15,000 rpm for 30 min and the supernatant solution collected was employed to determine the amount of dextran derivative. Table 4 summarizes the data for dextran derivative found in the permeate and the supernatant solutions at the end of each cycle. Dextran content of the covalently coupled particles was found to be 93.8 µg/mg after final diafiltration.

TABLE 4

| Cycle No. | Dextran content (µg/mL) | |
|---|---|---|
| | Supernatant | Permeate |
| 1 | >250* | >250 |
| 2 | 5,555 | 5,939 |
| 4 | 1,075 | 1,001 |
| 7 | 83 | 34 |
| 10 | 0^ | 0 |
| 13 | 0 | 0 |

*greater than the highest dextran standard used in anthrone assay;
^below sensitivity of the anthrone test.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. Furthermore, the foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Many modifications and variations are possible in view of the above teachings. The embodiments were chosen and described in order to explain the principles of the invention and its practical applications and to thereby enable others skilled in the art to utilize the invention.

What is claimed is:

1. A method of reducing an amount of non-covalently bound polysaccharide on a support, the method comprising:
    contacting a support comprising both covalently bound polysaccharide and non-covalently bound polysaccharide with an aqueous solution comprising an amount of a chaotropic agent effective to remove non-covalently bound polysaccharide from the support wherein the amount of chaotropic agent in the aqueous solution is about 0.1 M to about 1 M and
    separating the support from the aqueous solution wherein the separating comprises contacting the aqueous solution with a membrane and wherein substantiality all of the non-covalently bound polysaccharide passes through the membrane.

2. The method according to claim 1, wherein the polysaccharide is a dextran derivative.

3. The method according to claim 1, wherein the support is particulate.

4. The method according to claim 1, wherein the support is a latex support.

5. The method according to claim 1, wherein the chaotropic agent is selected from the group consisting of trifluoroacetate salts, trichloroacetate salts, thiocyanate salts, urea salts, thiourea salts, guanidinium salts, perchlorate salts, nitrate salts, bromide salts, iodide salts, trifluoromethane sulfonate salts, hexafluorophosphate salts, and bis(trifluoromethanesulfonyl)imidourea salts.

6. The method according to claim 1, wherein the aqueous solution comprises two or more chaotropic agents.

7. A method of preparing a conjugate of a support and an assay molecule, said method comprising:
    (a) treating a support under conditions for covalently binding a polysaccharide to the support such that the support comprises both covalently bound polysaccharide and non-covalently bound polysaccharide,
    (b) contacting the support with an aqueous solution comprising an amount of a chaotropic agent effective to remove non-covalently bound polysaccharide from the support wherein the amount of chaotropic agent in the aqueous solution is about 0.1 M to about 1 M,
    (c) separating the support from the aqueous solution wherein the separating comprises contacting the aqueous solution with a membrane and wherein substantially all of the non-covalently bound polysaccharide passes through the membrane, and
    (d) contacting the support with an assay molecule under conditions for binding of the assay molecule to the covalently bound polysaccharide.

8. The method according to claim 7, wherein the polysaccharide is a dextran derivative.

9. The method according to claim 7, wherein the support is particulate.

10. The method according to claim 7, wherein the support is a latex support.

11. The method according to claim 7, wherein the chaotropic agent is selected from the group consisting of trifluoroacetate salts, trichloroacetate salts, thiocyanate salts, urea salts, thiourea salts, guanidinium salts, perchlorate salts, nitrate salts, bromide salts, iodide salts, trifluoromethane sulfonate salts, hexafluorophosphate salts, and bis(trifluoromethanesulfonyl)imidourea salts.

12. The method according to claim 7, wherein the aqueous solution comprises two or more chaotropic agents.

13. The method according to claim 7, wherein the separating comprises contacting the aqueous solution to a membrane wherein substantially all of the non-covalently bound polysaccharide passes through the membrane.

14. The method according to claim 7, wherein the assay molecule is selected from the group consisting of members of a specific binding pair and members of a signal-producing system.

15. A method of reducing an amount of non-covalently bound dextran or dextran derivative on a latex particle the method comprising:

(a) contacting a latex particle comprising both covalently bound dextran derivative and non-covalently bound dextran derivative with an aqueous solution comprising an amount of one or more chaotropic agents effective to remove non-covalently bound dextran derivative from the support, and (b) separating the latex particle from the aqueous solution by contacting the aqueous solution with a membrane wherein substantially all of the non-covalently bound dextran derivative passes through the membrane.

16. The method according to claim 15, wherein the chaotropic agent is selected from the group consisting of trifluoroacetate salts, trichloroacetate salts, thiocyanate salts, urea salts, thiourea salts, guanidinium salts, perchlorate salts, nitrate salts, bromide salts, iodide salts, trifluoromethane sulfonate salts, hexafluorophosphate salts, and bis(trifluoromethanesulfonyl)imidourea salts.

17. The method according to claim 15, wherein the dextran derivative is aminodextran, dextran aldehyde, dextran sulfate or carboxydextran.

* * * * *